United States Patent
Fukuda et al.

[11] Patent Number: 6,109,104
[45] Date of Patent: Aug. 29, 2000

[54] PARALLEL PLATE TYPE OSCILLATORY GYROSCOPE

[75] Inventors: Toshio Fukuda, 66, Yada-cho 2-chome, Higashi-ku Nagoya-shi, Aichi-ken 461-00472; Fumihito Arai, 5-1, Aoyagi-cho 6-chome, Chikusa-ku, Nagoya-shi, Aichi-ken 464-0852; Koichi Itoigawa; Hitoshi Iwata, both of Aichi-ken, all of Japan

[73] Assignees: Fumihito Arai; Toshio Fukuda; Kabushiki Kaisha Tokai Rika Denki Seisakusho, all of, Japan

[21] Appl. No.: 09/329,546

[22] Filed: Jun. 10, 1999

[30] Foreign Application Priority Data

Jun. 15, 1998 [JP] Japan .................................. 10-167104

[51] Int. Cl.[7] .................................................. G01C 19/00
[52] U.S. Cl. ...................................... 73/504.13; 73/504.14
[58] Field of Search ........................... 73/504.12, 504.13, 73/504.14, 504.04, 504.03, 504.02; 310/311

[56] References Cited

U.S. PATENT DOCUMENTS

| | | | |
|---|---|---|---|
| 4,409,836 | 10/1983 | Comroe et al. ...................... | 73/504.14 |
| 5,226,324 | 7/1993 | Oikawa et al. ...................... | 73/504.12 |
| 5,256,929 | 10/1993 | Terajima .................................. | 310/326 |
| 5,874,674 | 2/1999 | Kasanami et al. .................. | 73/504.14 |
| 5,969,248 | 10/1999 | Kurachi et al. ...................... | 73/504.12 |
| 6,023,973 | 2/2000 | Yabe et al. ............................ | 73/504.12 |

*Primary Examiner*—Richard A. Moller
*Attorney, Agent, or Firm*—Vidas, Arrett & Steinkraus PA

[57] ABSTRACT

A highly sensitive oscillatory gyroscope that includes an elastic metal body in the form of a rectangular column having first to fourth sides. The elastic metal body includes a pair of end segments located at its ends and a pair of middle segments located at an upper middle portion and a lower middle portion of the elastic metal body. Each end segment has an opening extending from the second side to the fourth side, and each middle segment has an opening extending from the first side to the third side. A first ferroelectric substance film is provided on each of the first and third sides at the end segments. A second ferroelectric substance film is provided on each of the second and fourth sides at the middle segments. First and second electrodes are provided on each first ferroelectric substance film at each end segment. Third and fourth electrodes are provided on each second ferroelectric substance film at each middle segment.

10 Claims, 8 Drawing Sheets

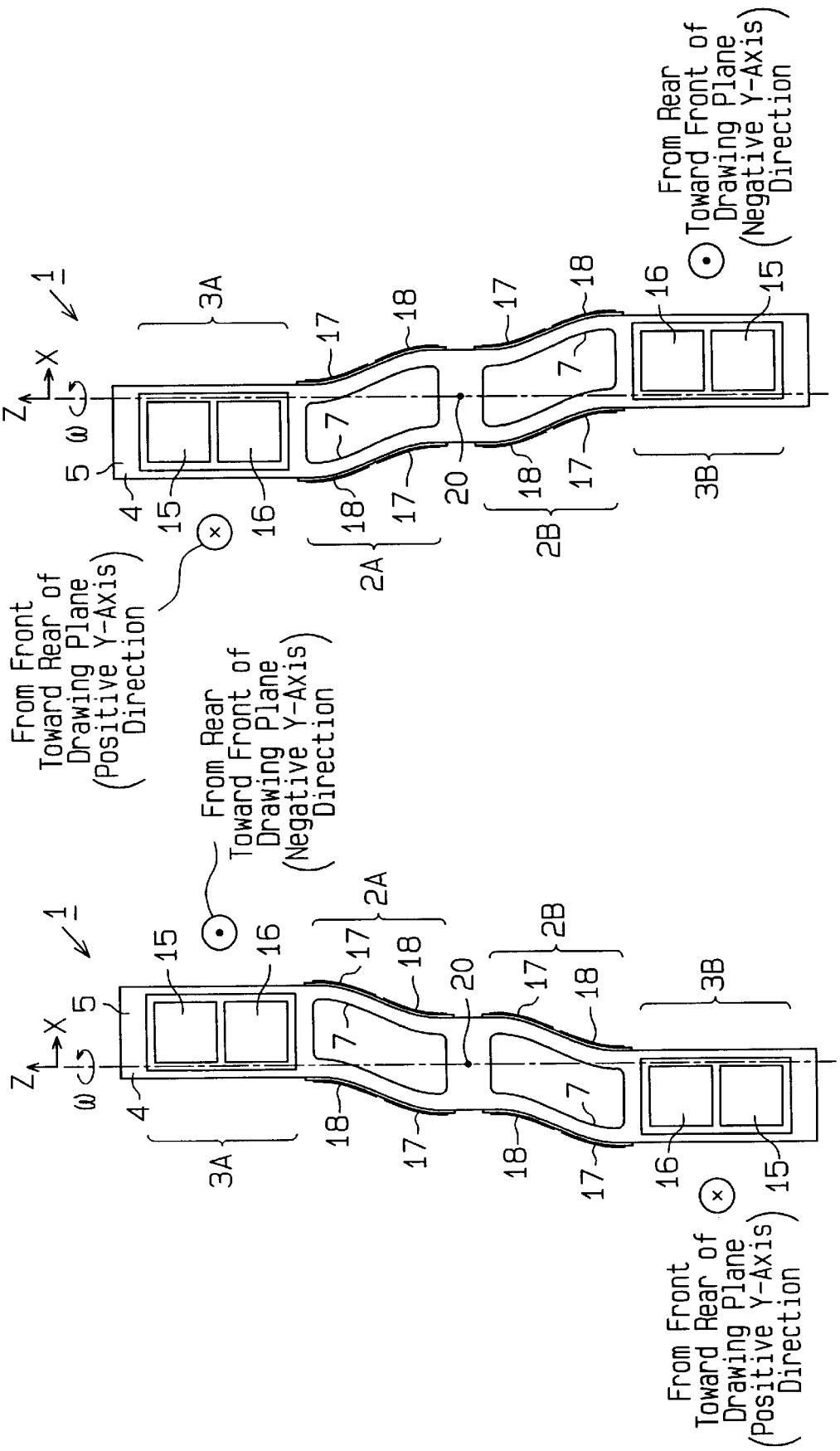

PARALLEL PLATE TYPE OSCILLATORY GYROSCOPE

BACKGROUND OF THE INVENTION

The present invention relates to a parallel plate type oscillatory gyroscope, and more particularly, to a highly sensitive parallel plate type oscillatory gyroscope.

A conventional tuning-fork type oscillatory gyroscope is shown in FIG. 1. As shown in FIG. 1, the tuning-fork type oscillatory gyroscope 21 includes a pair of piezoelectric ceramic driving plates 23, the base ends of which are connected to each other by a connection plate 22. The driving plates 23 are parallel to each other and their planes are normal to the X-axis, as shown in FIG. 1. A pair of piezoelectric ceramic detection plates 24 are located on centers of the distal ends of the driving plates 23, respectively. The detection plates 24 lie in a plane normal to the Y-axis, which is perpendicular to the X-axis, as shown in FIG. 1. Alternating voltage is applied to the driving plates 23, which causes them to oscillate in the positive and negative directions of the X-axis. If rotation about the Z-axis is imparted to the oscillatory gyroscope 21, the detection plates 24 distort and produce a voltage. Detection of this voltage permits a force acting on the detection plates 24, or, a Coriolis force Fc, to be sensed. The Coriolis force Fc is generally represented by the following formula (1):

$$Fc = 2mV \times \omega \quad (1)$$

where m indicates the mass of the oscillatory gyroscope 21, V indicates the oscillating rate, and $\omega$ indicates the angular velocity of the oscillatory gyroscope 21 about the Z-axis.

The plates 23, 24 are formed from bulk PZT (lead zirconate titanate, or ceramics containing a solid solution of lead titanate and lead zirconate). However, it is difficult to form bulk PZT into thin plates and thus difficult to reduce the size of the oscillatory gyroscope.

Furthermore, each driving plate 23 must be perpendicular to the associated detection plate 24. Each set of associated plates 23, 24 must also be symmetric. This complicates assembly. In addition, if the oscillating element has a three-dimensional structure, the bulk PZT further complicates assembly.

As apparent from formula (1), the Coriolis force Fc increases proportionally to the mass m of the oscillatory gyroscope. Thus, a greater mass m increases the distortion amount of the detection plates 24 and increases the detecting sensitivity. However, the employment of a larger bulk PZT to increase the mass of the oscillatory gyroscope is undesirable.

It is also apparent from formula (1) that the Coriolis force Fc increases proportionally to the oscillating rate V. Thus, a higher oscillating rate V increases the distortion amount of the detection plates 24 and improves the detection sensitivity. The oscillating rate V can be increased by using a thinner bulk PZT. However, this would decrease the rigidity of the driving plates 23. The driving plates 23 apt to twist if they are less rigid. Such twisting would cause vibrations that interfere with accurate voltage detection when the detection plates 24 distort.

SUMMARY OF THE INVENTION

Accordingly, it is an objective of the present invention to provide an oscillatory gyroscope having a higher detecting sensitivity.

To achieve the above objective, the present invention provides an oscillatory gyroscope that includes an elastic metal body in the form of a rectangular column having first to fourth sides. The first and third sides are opposite, and the second and fourth sides are opposite. The elastic metal body includes a pair of end segments located at its ends and a pair of middle segments located at an upper middle portion and a lower middle portion of the elastic metal body. Each end segment has an opening extending from the second side to the fourth side, and each middle segment has an opening extending from the first side to the third side. A first ferroelectric substance film is provided on each of the first and third sides at the end segments. A second ferroelectric substance film is provided on each of the second and fourth sides at the middle segments. First and second electrodes are provided on each first ferroelectric substance film at each end segment. Third and fourth electrodes are provided on each second ferroelectric substance film at each middle segment.

In another aspect of the present invention, an oscillatory gyroscope apparatus including an oscillatory gyroscope is provided. The gyroscope includes an elastic metal body in the form of a rectangular column having first to fourth sides. The first and third sides are opposite, and the second and fourth sides are opposite. The elastic metal body includes a pair of end segments located at its ends and a pair of middle segments located at an upper middle portion and a lower middle portion of the elastic metal body. Each end segment has an opening extending from the second side to the fourth side, and each middle segment has an opening extending from the first side to the third side. A first ferroelectric substance film is provided on each of the first and third sides at the end segments. A second ferroelectric substance film is provided on each of the second and fourth sides at the middle segments. First and second electrodes are provided on each first ferroelectric substance film at each end segment. Third and fourth electrodes are provided on each second ferroelectric substance film at each middle segment. The oscillatory gyroscope apparatus further includes an oscillation circuit for generating an oscillation signal having a predetermined frequency. A reverse amplification circuit is connected to the oscillation circuit for reversing the oscillation signal and for generating a reverse voltage signal. The voltage signal is applied to the third electrodes of the middle segments. A non-reverse amplification circuit is connected to the oscillation circuit for generating a voltage signal based on the oscillation signal. The voltage signal is applied to the fourth electrodes of the middle segments. The oscillatory gyroscope apparatus also include a pair of first differential circuits and a pair of second differential circuits. Each first differential circuit is connected to the first and second electrodes of one of the end segments, respectively. The pair of first differential circuits receive first piezoelectric signals generated by deformation of portions of the first ferroelectric substance films that correspond to the associated first and second electrodes. The pair of first differential circuits also generate first differential voltage signals representing the difference of the first piezoelectric signals. Each second differential circuit is connected to the first and second electrodes of the other end segment. The pair of second differential circuits receive second piezoelectric signals generated by deformation of portions of the corresponding first ferroelectric substance films. The pair of second differential circuits also generate second differential voltage signals representing the difference of the second piezoelectric signals. A first adder is connected to the pair of first differential circuits for adding the first differential voltage signals and generating a first added signal. A second adder is connected to the pair of second differential circuits for adding the second differential voltage signals and generating a second added signal. A third adder is connected to the first and second adder for adding the first and second added signals and generating a detection signal.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 10 and 11 are schematic views illustrating the movement of the oscillatory gyroscope of FIG. 3 during operation;

DETAILED DESCRIPTION OF THE PREFERRED EMBODIMENTS

Figure 1:
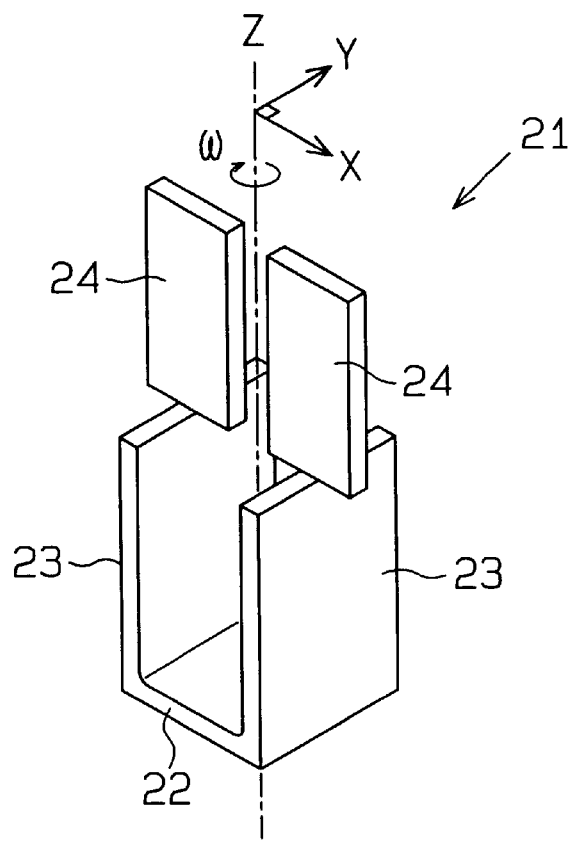
FIG. 1 is a schematic perspective view showing a prior art oscillatory gyroscope.
Figure 2:
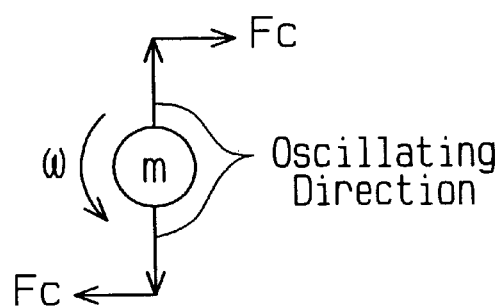
FIG. 2 is a diagram illustrating the Coriolis.

In the drawings, like numerals are used for like elements throughout.

Figure 3:
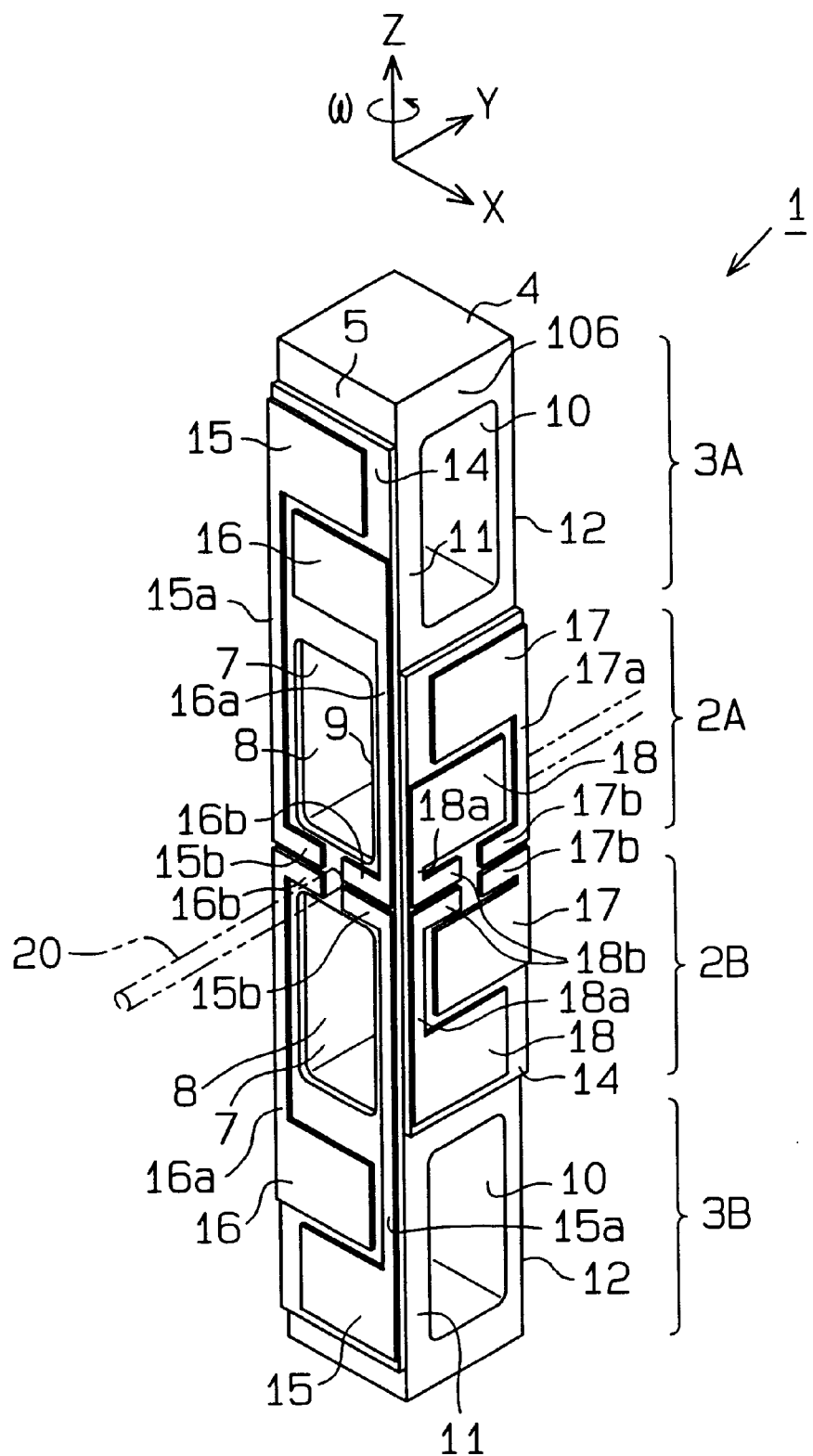
FIG. 3 is a schematic perspective view showing an oscillatory gyroscope according to one embodiment of the present invention.

An oscillatory gyroscope 1 has a rectangular column-like substrate 4, which is preferably made of an elastic metal such as stainless steel. Although a square cross-sectional shape is preferred, the substrate 4 may have other arbitrary cross-sectional shapes. The substrate 4 has a first side 5, a second side 6 (FIG. 4), a third side 105 (FIG. 5), and a fourth side 106. The first side 5 is normal to the Y-axis and faces the negative direction of the Y-axis. The second side 6 is located adjacent to the first side 5, and the third side 105 and the fourth side 106 are subsequently designated in the clockwise direction as viewed in the negative direction of the Z-axis in FIG. 3. The first side 5 and the third side 105 are on opposite sides, while the second side 6 and the fourth side 106 are on opposite sides (FIG. 3 shows only the first and fourth sides 5, 106).

A pair of middle openings 7 extend through the middle part of the substrate 4 from the first side 5 to the third side 105. A pair of end openings 10 extend through the substrate 7 near the ends from the second side 6 to the fourth side 106.

Accordingly, the axes of the middle openings 7 are perpendicular to those of the end openings 10. It is preferred that the openings 7, 10 have a rectangular cross-section. Although the middle openings 7 are perpendicular to the end openings 10, they are shown as being parallel to one another in FIG. 4 for ease of illustration.

Each middle opening 7 is defined between a pair of middle plates 8, 9. The outer surfaces of the middle plates 8 define the second side 6, while the outer surfaces of the middle plates 9 define the fourth side 106. The middle plates 8, 9 are preferably about 200 $\mu$m thick. The upper middle plates 8, 9 and the upper middle opening 7 are included in an upper-middle parallel plate segment 2A, which is located at the upper middle part of the substrate 4. A lower-middle parallel plate segment 2B, which is located at the lower middle part of the substrate 4 includes the lower middle plates 8, 9 and the lower middle opening 7. The upper-middle and lower-middle parallel plate segments 2A, 2B function as driving segments.

Parallel end plates 11, 12 extend along the upper and lower ends of the substrate 4 to define the end openings 10. The outer surfaces of the end plates 11 defines the first side 5, while the outer surfaces of the end plates 12 define the third side 105. The end plates 11, 12 are preferably about 200 $\mu$m thick. It is preferred that the middle plates 8, 9 and the end plates 11, 12 have the same thickness. The upper end plates 11, 12 and the upper end opening 10 are included in an upper parallel plate segment 3A, while the lower end plates 11, 12 and the lower end opening 10 are included in a lower parallel plate segment 3B. The upper and lower parallel plate segments 3A, 3B function as detection segments. Accordingly, the middle plates 8, 9 of the middle parallel plate segments 2A, 2B are perpendicular to the end plates 11, 12 of the upper and lower parallel plate segments 3A, 3B.

The upper two parallel plate segments 3A, 2A are symmetric to the lower two parallel plate segments 3B, 2B with respect to a horizontal plane that includes the axis of a fixed shaft 20, which extends through the middle of the oscillatory gyroscope 1 and which will be described in more detail later. Therefore, the two upper parallel plate segments 3A, 2A and the two lower parallel plate segments 3B, 2B have substantially the same structure. For the sake of brevity, like or same parts of the middle parallel plate segments 2A, 2B and of the upper and lower parallel plate segments 3B, 2B have been denoted with the same reference number. The description will hereafter mainly center on the upper two parallel plate segments 2A, 3A.

Figure 7:
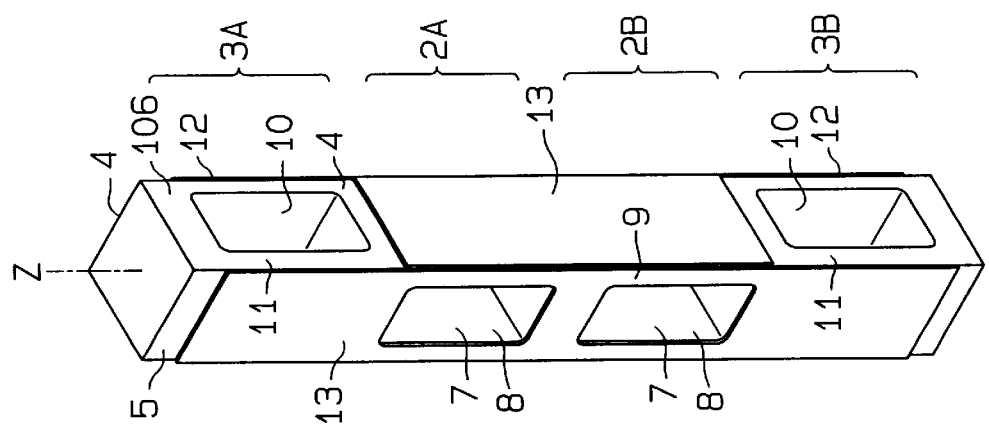
FIGS. 5 to 9 are schematic perspective views illustrating the gyroscope of FIG. 3 at various stages of its manufacturing process.
Figure 8:
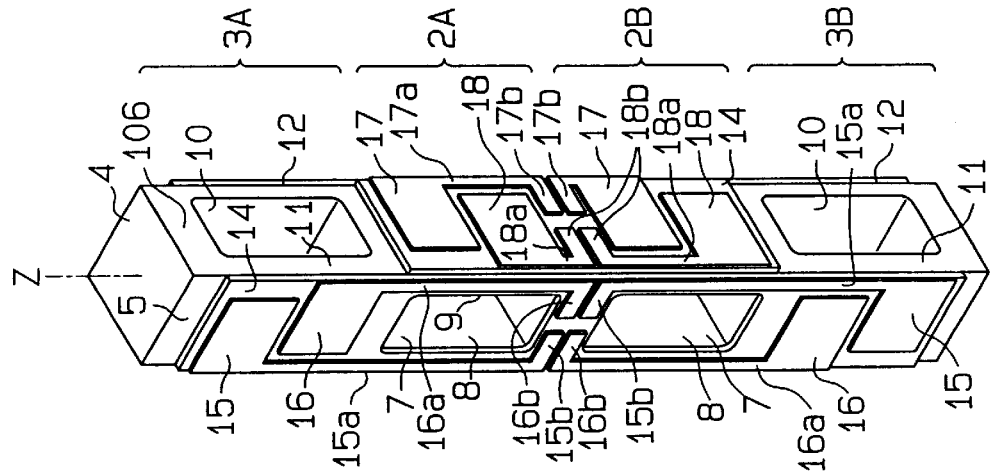
Figure 12:
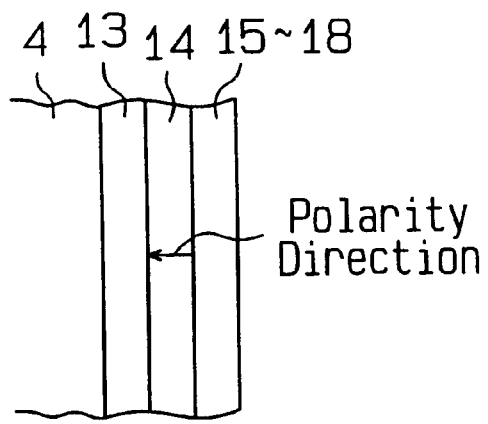
FIG. 12 is a partial enlarged side view showing the oscillatory gyroscope of FIG. 3.

Titanium films 13 are arranged on the second and fourth sides 6, 106 of the parallel plate segment 2A (FIGS. 7 and 25 12). Further titanium films 13 are arranged on the first and third sides 5, 105 of the parallel plate segment 3A. It is preferred that the titanium films 13, which serve as base surfaces, be formed by sputtering. Each titanium film 13 is completely covered by a PZT thin film 14 (FIG. 8), the thickness of which is preferably about 20 $\mu$m to 30 $\mu$m. The PZT thin film 14 includes a ferroelectric film.

Figure 4:
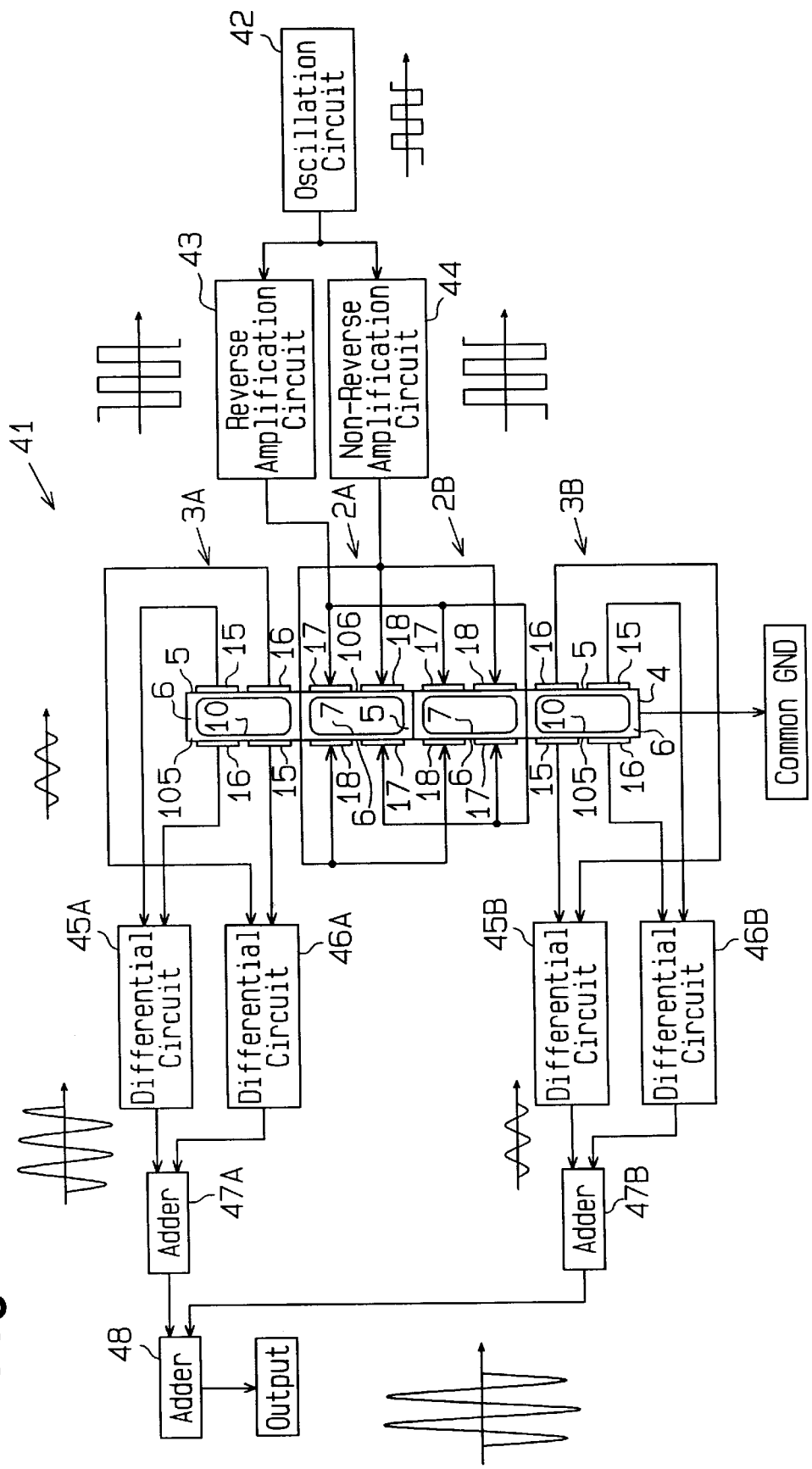
FIG. 4 is a block diagram showing an oscillatory gyroscope apparatus incorporating the oscillatory gyroscope of FIG. 3.

As shown in FIG. 4, a first electrode film 15 and a second electrode film 16 are arranged on each PZT film 14 of the first and third sides 5, 105. The first and second electrode films 15, 16 are separated from each other in the 5 longitudinal direction of the substrate (Z-axis) by a predetermined distance (FIG. 3 shows only the first side 5). It is preferred that the first and second electrode films 15, 16 be made of aluminum, have a thickness of about 1 $\mu$m to 2 $\mu$m, and have substantially the same area. The arrangement of the first and second electrode films 15, 16 on the third side 105 is reversed from that on the first side 5 (FIG. 4).

Figure 13:
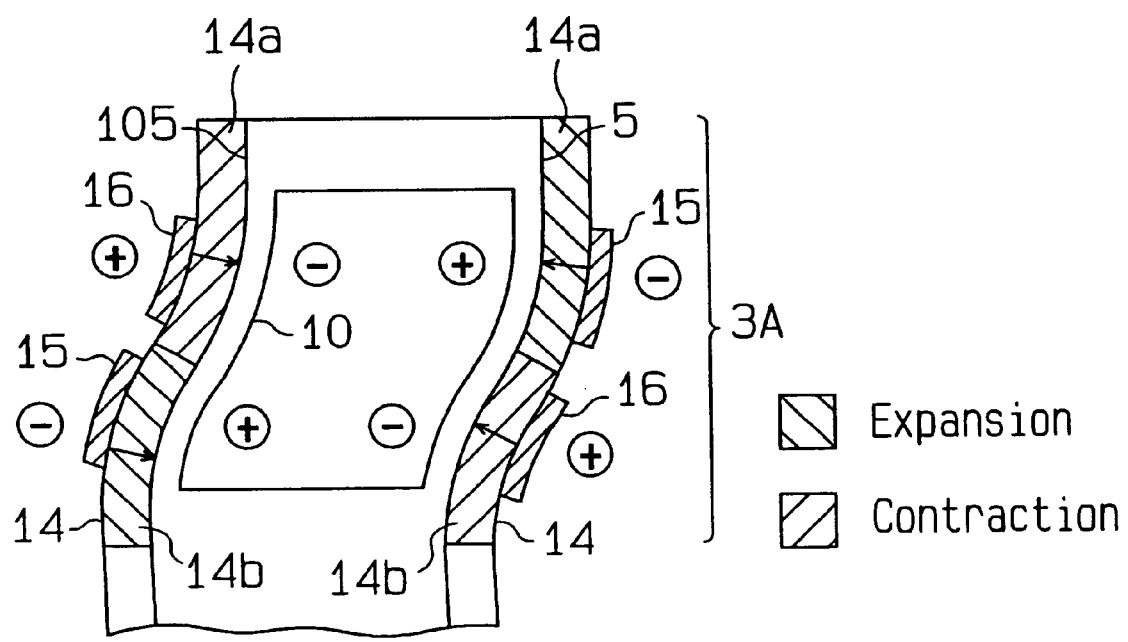
FIG. 13 is a schematic view illustrating the movement of the oscillatory gyroscope of FIG. 3.

As shown in FIG. 13, if, for example, the parallel plate segment 3A deforms in the direction of the X-axis (left to right as viewed in FIG. 13), the upper portion 14a of the PZT thin film 14 on the first side 5 expands, while the lower portion 14b contracts. Simultaneously, the upper portion 14a of the PZT thin film 14 on the third side 105 contracts, while the lower portion 14b expands. The first and second electrode films 15, 16 are arranged on the upper and lower portions 14a, 14b of the PZT thin films 14 at locations that expand and contract. In FIG. 13, the polarization direction of the PZT thin film 14 is indicated by the arrows. Further, for illustrative convenience, the titanium films 13 are not shown in FIG. 3.

Returning to FIG. 3, the electrode films 15, 16 have extensions 15a, 16a, respectively. The extensions 15a, 16a extend from one end of the associated electrode film 15, 16 toward the middle of the substrate 4. More specifically, the extensions 15a, 16a are arranged on the upper middle plates 8, 9 of the parallel plate segment 2A. The extension 15a is longer than the extension 16a. Pads 15b, 16b are connected to the extensions 15a, 16a, respectively (only the pads 15b, 16b of the first side 5 are shown in FIG. 3). The pads 15b, 16b extend from the distal end of the associated extensions 15a, 16a toward the center of the oscillatory gyroscope 1. It is preferred that the pads 15b, 16b be made of aluminum, have a thickness of about 1 $\mu$m to 2 $\mu$m, and have the same area.

A third electrode film 17 and a fourth electrode film 18 are arranged on each PZT film 14 of the second and fourth sides 6, 106. The third and fourth electrode films 17, 18 are separated from each other in the longitudinal direction of the substrate (Z-axis) by a predetermined distance (FIG. 3 shows only the fourth side 106). It is preferred that the third and fourth electrode films 17, 18 be made of aluminum, have a thickness of about 1 $\mu$m to 2 $\mu$m, and have substantially the same area. The arrangement of the third and fourth electrode films 17, 18 on the fourth side 106 is reversed from that on the second side 6 (FIG. 4). This arrangement deforms the lower portion 14b of the PZT thin film 14 on the second side 6 in the same manner as the upper portion 14a of the PZT thin film 14 on the opposite fourth side 106 when voltages having opposite polarities are applied to the third and fourth electrode films 17, 18, respectively. Such deformation of the PZT thin films 14 drives the parallel plate segment 2A efficiently.

The electrode films 17, 18 have extensions 17a, 18a, respectively. The extensions 17a, 18a extend from one end of the associated electrode films 17, 18 toward the middle of the substrate 4. More specifically the extensions 17a, 18a are arranged along the edges of the fourth side 106 in the parallel plate segment 2A. The extension 17a is longer than the extension 18a. Pads 17b, 18b are connected to the extensions 17a, 18a, respectively. The pads 17b, 18b extend from the distal end of the associated extensions 17a, 18a toward the center of the oscillatory gyroscope 1. It is preferred that the pads 17b, 18b be made of aluminum, have a thickness of about 1 $\mu$m to 2 $\mu$m, and have the same area. A lead wire (not shown) is soldered to each pad 15b, 16b, 17b, 18b.

The fixed shaft 20 extends through the oscillatory gyroscope 1 between the parallel plate segments 2A, 2B (i.e., the middle of the oscillatory gyroscope 1). More specifically, the fixed shaft 20 is fixed to extend through the first and third sides 5, 105. The axis of the fixed shaft 20 substantially passes through the center of gravity of the oscillatory gyroscope 1. The ends of the fixed shaft 20 are supported by a base (not shown).

In the drawings, the thicknesses of the titanium films 13, the electrode films 15–18, and the plates 8, 9, 11, 12 are exaggerated for illustrative purposes.

The manufacturing process of the oscillatory gyroscope will now be described with reference to FIGS. 4 to 9.

Figure 6:
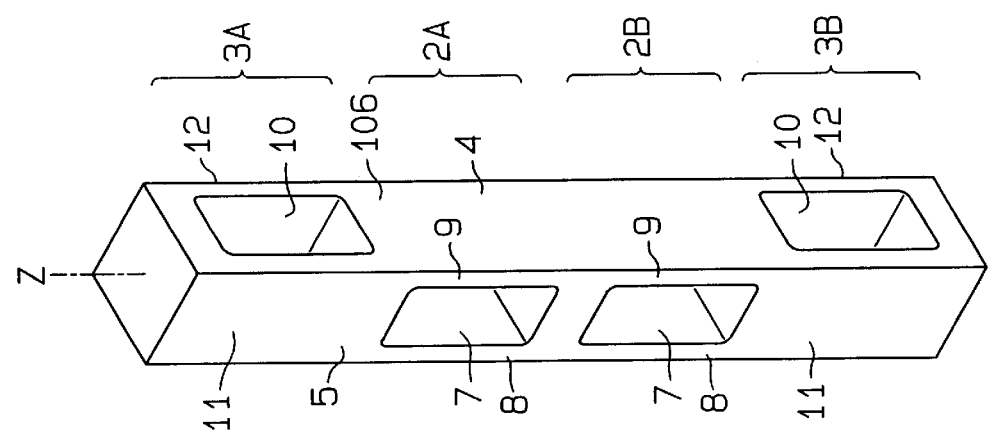
Figure 5:
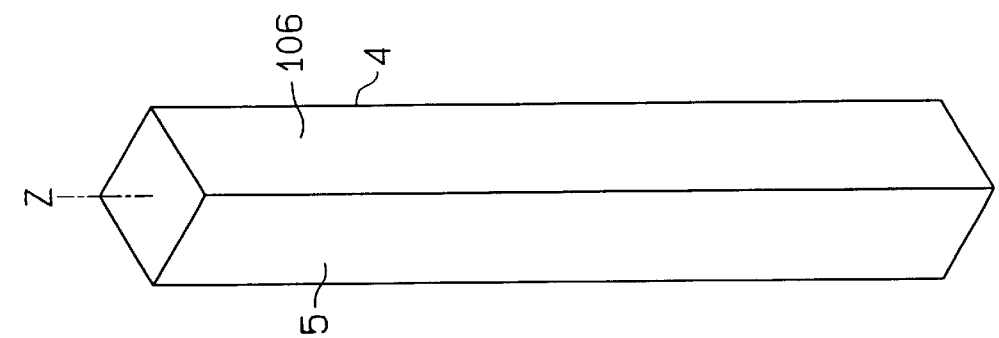

FIG. 5 shows the rectangular column-like substrate 4. It is preferred that the substrate 4 be made of stainless steel and have a square cross-section. As shown in FIG. 6, the middle openings 7, 10 are formed by etching or machining the upper and lower halves of the substrate 4. The middle openings 7 form two sets of the middle plates 8, 9 at the upper and lower middle parts of the substrate 4. Each middle plate 8, 9 has a thickness of about 200 $\mu$m. The outer surfaces of the middle plates 8 correspond to the second side 6, while the outer surfaces of the middle plates 9 correspond to the fourth side 106. The upper middle plates 8, 9 and the upper middle opening 7 define the upper-middle parallel plate segment 2A, while the lower middle plates 8, 9 and the lower middle opening 7 define the lower-middle parallel plate segment 2B.

The end openings 10 form two sets of the end plates 11, 12 at the upper and lower ends of the substrate 4. Each end plate 11, 12 has a thickness of about 200 $\mu$m. The outer surfaces of the end plates 11 correspond to the first side 5, while the outer surfaces of the end plates 12 correspond to the third side 105. The upper end plates 11, 12 and the end opening 10 define the upper parallel plate segment 3A, while the lower end plates 11, 12 and the lower end opening 10 define the lower parallel plate segment 3B.

Subsequently, it is preferred that the substrate be cleaned with acid. It is also preferred that a mask (not shown), which is made of a metal other than titanium, be applied to the entire surface of the substrate 4, excluding portions to which the PZT thin films 14 are applied. The mask may be formed by employing a physical film formation process, such as sputtering or vacuum evaporation. A synthetic resin may also be applied to the surface of the substrate 4 as the mask.

As shown in FIG. 7, the titanium films 13 are then formed on the second and fourth sides 6, 106 of the parallel plate segments 2A, 2B and on the first and third sides 5, 105 of the parallel plate segments 3A, 3B. The titanium films 13 may be formed by employing a physical film formation process, such as sputtering or vacuum evaporation. Afterward, PZT thin films 14 are formed on the titanium film 13 by employing a hydrothermal process. The hydrothermal process includes two stages.

First Stage

The substrate 4, an aqueous solution containing zirconium oxychloride ($ZrOCl_2.8H_2O$) and lead nitrate ($Pb(NO_3)_2$), and a potassium hydroxide (KOH(8N)) solution are placed in a Teflon container (not shown) and agitated. The mol ratio between the zirconium oxychloride and the lead nitrate is adjusted to determine the piezoelectric characteristic of the PZT thin film 14. In other words, the adjustment of the mol ratio determines the composition ratio of lead titanate and zirconate, which are included in the PZT thin film 14.

The substrate 4 is then fixed to a pressure vessel (now shown). An aqueous solution containing zirconium oxychloride ($ZrOCl_2.8H_2O$) and lead nitrate ($Pb(NO_3)_2$), and a potassium hydroxide (KOH(8N)) solution are heated and pressurized in the vessel while being agitated. The pressurizing is performed by the vapor pressure of the heated solution. The heated and pressurized state lasts for 48 hours under a temperature of 150° C. The agitating speed is 300 rpm. Consequently, PZT seed crystals are formed on the surface of each titanium film 13 of the parallel plate segments 2A, 2B, 3A, 3B in a supersaturated state. After a predetermined length of time elapses, the substrate 4 is removed from the pressure vessel. The substrate 4 is then washed with water and dried.

Second Stage

Subsequently, the substrate 4, on which the seed crystals are formed, an aqueous solution containing zirconium oxychloride ($ZrOCl_2.8H_2O$) and lead nitrate ($Pb(NO_3)_2$), and a potassium hydroxide (KOH(4N)) solution are placed in a Teflon container (not shown) and agitated. The mol ratio between the zirconium oxychloride, titanium tetrachloride, and lead nitrate is adjusted to determine the piezoelectric characteristic of the PZT thin film 14. In other words, the adjustment of the mol ratio determines the composition ratio of lead titanate and zirconate, which are included in the PZT thin film 14.

The substrate 4 is then fixed to a pressure vessel (now shown). An aqueous solution containing zirconium oxychloride ($ZrOCl_2$-$8H_2O$) and lead nitrate ($Pb(NO_3)_2$), and a titanium tetrachloride ($TiCl_4$) and potassium hydroxide (KOH(4N)) solution are heated and pressurized in the vessel while being agitated. The heated and pressurized state lasts for 48 hours under a temperature of 120° C. The agitating speed is 300 rpm. Consequently, the PZT thin films 14 having the predetermined thickness are formed on the surface of each titanium film 13 of the parallel plate segments 2A, 2B, 3A, 3B in a supersaturated state. After a predetermined length of time elapses, the substrate 4 is removed from the pressure vessel. The substrate 4 is then washed with water and dried. Afterward, the mask is removed from the substrate 4.

Figure 9:
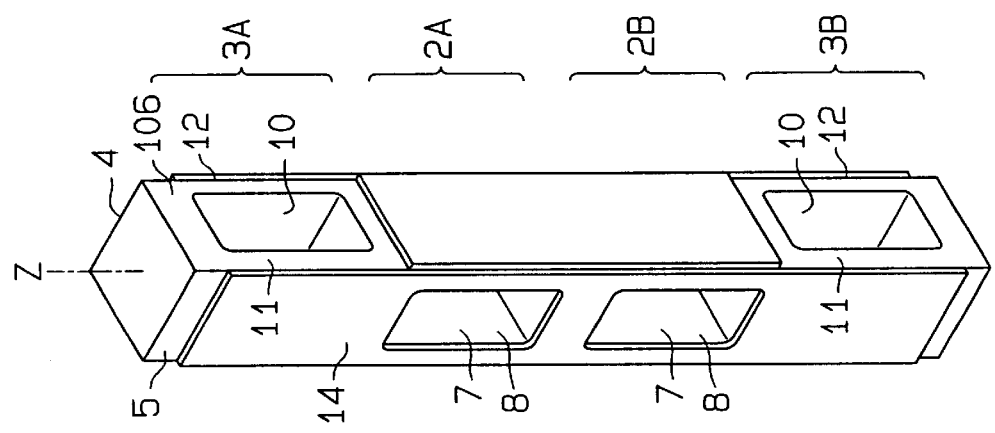

An aluminum layer is then formed on the surface of each PZT thin film 14 by carrying out a physical film formation process, such as sputtering or vacuum evaporation. Patterning is then performed to remove unnecessary sections of the aluminum layer and to form the electrode films 15, 16, 17, 18, which include the extensions 15a, 16a, 17a, 18a and the pads 15b, 16b, 17b, 18b, respectively, as shown in FIG. 9. The oscillatory gyroscope 1 is formed in this manner. Subsequently, a lead wire is soldered to each pad 15b, 16b, 17b, 18b. The fixed shaft 20 is then extended through and fixed to the middle portion of the oscillatory gyroscope 1 (i.e., between the parallel plate segments 2A, 2B).

FIG. 4 is a block diagram showing an oscillatory gyroscope apparatus 41, which incorporates the oscillatory gyroscope 1. The oscillatory apparatus 41 includes an oscillation circuit 42, which generates voltage signals having a predetermined frequency. The oscillation circuit 42 sends the voltage signals to a reverse amplification circuit 43 and a non-reverse amplification circuit 44. The reverse amplification circuit 43 reverses and amplifies voltage signals and applies the reversed and amplified voltage signals to the third electrode film 17 of the oscillatory gyroscope 1. The non-reverse amplification circuit 44 amplifies voltage signals and applies the amplified voltage signals to the fourth electrode film 18 of the oscillatory gyroscope 1. The substrate 4 of the oscillatory gyroscope 1 is grounded.

A first set of the opposing first and second electrode films 15, 16 in the parallel plate segment 3A and in the parallel plate segment 3B are electrically connected to first differential circuits 45A, 45B, respectively. Each first differential circuit 45A, 45B receives piezoelectric signals from the associated first and second electrode films 15, 16 to amplify the difference between the piezoelectric voltage signals by two and generate a first piezoelectric signal.

A second set of the opposing first and second electrode films 15, 16 are electrically connected to second differential circuits 46A, 46B, respectively. The second differential circuits 46A, 46B receive piezoelectric signals from the associated first and second electrode films 15, 16 to amplify the difference between the piezoelectric signals by two and generate a second piezoelectric signal.

An adder 47A receives the first and second piezoelectric signals from the first and second differential circuits 45A, 46A. The adder 47A adds the first and second piezoelectric signal and generates a third piezoelectric signal, which is greater by four times, while matching the polarity of the first and second piezoelectric signals. An adder 47B receives the first and second piezoelectric signals from the first and second differential circuits 45B, 46B. The adder 47B adds the first and second piezoelectric signal and generates a fourth piezoelectric signal, which is greater by four times, while matching the polarity of the first and second piezoelectric signals. A further adder 48 receives the third and fourth piezoelectric signals from the associated adders 47A, 47B and generates a piezoelectric signal that is greater by eight times.

To use the oscillatory gyroscope 41, the reverse amplification circuit 43 and the non-reverse amplification circuit 44 apply an alternating voltage to the associated electrode films 17, 18 of the parallel plate segments 2A, 2B with the two ends of the fixed shaft 20 supported by a base (not shown). This alternately contracts and expands the upper and lower portions of the PZT thin film 14, at locations corresponding to the electrode films 17, 18, on the second side 6. The upper and lower portions of the PZT thin film 14, at locations corresponding to the electrode films 17, 18, on the fourth side 106 are also contracted and expanded alternately. More specifically, if the polarization direction is directed toward the substrate 4 from the PZT thin film 14, the portion of the PZT thin film 14 to which a positive potential is applied contracts. The portion of the PZT thin film 14 to which a negative potential is applied expands. Consequently, the parallel plate segments 2A, 2B are driven in the positive and negative X-axis directions thereby oscillating the parallel plate segments 3A, 3B in the positive and negative X-axis directions. In FIGS. 10 and 11, the extensions 15a, 16a, 17a, 18a and the pads 15b, 16b, 17b, 18b are not shown.

A Coriolis force acts on the parallel plate segments 3A, 3B when an angular velocity ω is applied about the Z axis in the oscillatory gyroscope 1. As shown in FIG. 10, if the angular velocity ω is applied with the parallel plate segment 3A oscillating in the positive X-axis direction and the parallel plate segment 3B oscillating in the negative X-axis direction, a Coriolis force is applied to the parallel plate segment 3A in the negative Y-axis direction (from the rear side of the plane of the drawing toward the front side of the plane of the drawing). A further Coriolis force is applied to the parallel plate direction 3A in the positive Y-axis direction (from the front side of the plane of the drawing toward the rear side of the plane of the drawing).

As shown in FIG. 11, if the angular velocity ω is applied with parallel plate segment 3B oscillating in the negative X-axis direction and the parallel plate segment 3B oscillating in the positive X-axis direction, a Coriolis force is applied to the parallel plate segment 3A in the positive Y-axis direction. Further Coriolis force is applied to the parallel plate direction 3B in the negative Y-axis direction. As a result, the PXT thin film 14 of one of the parallel plate segments 3A, 3B contracts and the opposite PZT thin film 14 expands. As a result, the parallel plate segment 3A deforms as shown in FIG. 13. In such case, the upper portion 14a of the PZT thin film 14 on the first side 5 in the parallel plant segment 3A expands, while the lower portion 14b contracts. The upper portion 14a of the PZT thin films 4 on the third 105 contracts, while the lower portion 14b expands. The two sets of piezoelectric signals generated by the expansion and contraction of the PZT thin films 14 are sent to the first and second differential circuits 45A, 46A by way of the first and second electrode films 15, 16. In addition to the piezoelectric signals, leakage voltage of voltage signals from the reverse and on-reverse amplification circuits 43, 44 and noise is sent to the first and second differential circuits 45A, 46A.

A piezoelectric signal (detection signal) G1 output from the first electrode film 15 is represented as follows:

$$G1 = M+N-A$$

where M represents the leakage voltage, N represents the noise, and A represents the piezoelectric signal. In addition, the sign (plus or minus) of the piezoelectric signal A depends upon the polarity direction of the PZT thin film 14.

Further, a piezoelectric detection signal G2 output from the second electrode film 16 is represented as follows:

$$G2 = M+N+A$$

Of The first and second differential circuits 45A, 46A amplify the difference between the detection signals G1, G2 (G2−G1) and generate the first and second piezoelectric signals. The adder 47A adds the first and second piezoelectric signals and multiplies the sum by four to generate the third piezoelectric signal.

At The first and second differential circuits 45B, 46B each receive a detection signal G1 from the associated first electrode film 15 and a detection signal G2 from the associated second electrode film 16. The first and second differential circuits 45B, 46B then amplify the difference between the detection signals G1, G2 (G2−G1) and generate the first and second piezoelectric signals. The adder 47B adds the first and second piezoelectric signals and multiplies the sum by four to produce the fourth piezoelectric signal. The adder 48 adds the third piezoelectric signal, which is sent from the adder 47A, and the fourth piezoelectric signal, which is sent from the adder 47B, and then multiplies the sum by eight to produce the piezoelectric signal A. The Coriolis force acting on the oscillatory gyroscope 1 is determined based on the piezoelectric signal A. In addition, the angular velocity ω is computed from the Coriolis force Fc, the mass m of the oscillatory gyroscope 1, and the oscillating rate V in accordance with formula (1).

The preferred and illustrated embodiment has the advantages described below.

(1) The third and fourth electrode films 17, 18 on the second and fourth sides 6, 106, which are opposite (180° apart), are arranged so that the parallel plate segments 2A, 2B oscillate in opposite directions. This, in turn, oscillates the parallel plate segments 3A, 3B in the same directions as the parallel plate segments 2A, 2B. During oscillation of the parallel plate segments 2A, 2B, the application of an angular velocity ω generates a Coriolis force Fc, which is applied to the parallel plate segments 3A, 3B in opposite directions. This expands and contracts the PZT thin films 14 on the first and third sides 5, 105 in the parallel plate segments 3A, 3B. Consequently, the first and second electrode films 15, 16 generate piezoelectric signals in accordance with the expansion or contraction of the associated PZT thin films 14. In addition, the difference between the first and second piezoelectric signals, which is obtained from the first and second electrode films 15, 16, is amplified. This increases the detecting sensitivity of the parallel plate segments 3A, 3B.

(2) When acceleration is applied to the parallel plate segments 3A, 3B in the same direction as a Coriolis force, the difference between the output of the parallel plate segment 3A and that of the parallel plate segment 3B is null. This cancels the output related to the acceleration.

(3) As shown in FIG. 4, the arrangement of the first and second electrode films 15, 16 is reversed between the first side 5 and the third side 105. Accordingly, if, for example, the parallel plate segment 3A deforms like in FIG. 13, a piezoelectric signal corresponding to the expansion of the upper portion 14a of the PZT thin film 14 on the first side 5 and a piezoelectric signal corresponding to the expansion of the lower portion 14b of the PZT thin film 14 on the third side 105 are output from the two associated first electrode films 15. Further, a piezoelectric signal corresponding to the contraction of the lower portion 14b of the PZT thin film 14 on the first side 5 and a piezoelectric signal corresponding to the contraction of the upper portion 14a of the PZT thin film 14 on the third side 105 are output from the two associated second electrode films 16. This consequently generates piezoelectric signals that correspond to the expansion and contraction of the PZT thin films 14.

(4) The fixed shaft 20, by which the oscillatory gyroscope 1 is supported, is arranged such that its axis extends through the center of gravity of the oscillatory gyroscope 1. As a result, if a reaction force is produced by oscillations, the reaction force directed toward the center of the oscillatory gyroscope 1 is eliminated. This allows for the oscillatory gyroscope 1 to have stable sensing characteristics.

(5) As shown in FIG. 4, the arrangement of the third and fourth electrode films 17, 18 is reversed between the second and fourth sides 6, 106. Furthermore, the application of voltages having reversed polarities on the third and fourth electrode films 17, 18 causes the portion of the PZT thin film 14 corresponding with the third electrode film 17 to contract (or expand) and the portion of the PZT thin film 14 corresponding with the fourth electrode film 18 to expand (or contract). Accordingly, a portion of the PZT thin film 14 expands, while the corresponding portion of the opposing PZT thin film 14 contracts. This effectively deforms the parallel plate segments 2A, 2B.

(6) The PZT thin films 14 applied to the surface of the titanium films 13 of the parallel plate segments 2A, 2B, 3A, 3B have a thickness of about 20 μm to 30 μm. This reduces the dimensions of the oscillatory gyroscope 1.

(7) The parallel plate segments 2A, 2B, 3A, 3B minimizes twisting of the oscillatory gyroscope 1. Accordingly, the oscillations of the parallel plate segments 2A, 2B are accurate. Furthermore, the displacement of the parallel plate segments 3A, 3B is also accurate.

(8) Subsequent to the formation of the titanium films 13 on the outer surface of the substrate 4, a hydrothermal process is employed to form the PZT thin films 14 on the titanium films 13. The electrode films 15, 16, 17, 18 are then formed on the PZT thin films 14. As a result, the oscillatory gyroscope 1 has a constant detecting sensitivity. Furthermore, the employment of the hydrothermal process forms the driving PZT thin films 14 and the detection PZT thin films 14 are formed simultaneously. This simplifies the formation of the PZT thin films 14.

(9) The top part of the substrate 4 connecting the end plates 11, 12 in the parallel plate segment 3A, the bottom part of the substrate connecting the end plates 11, 12 in the parallel plate segment 3B, the connecting portion between the parallel plate segments 2A, 3A, and the connecting portion between the parallel plate segments 2B, 3B may be used to adjust the mass m of the oscillatory gyroscope 1. In other words, the mass m of the oscillatory gyroscope 1 can be adjusted by changing the mass of the connecting portions as required. Adjustment of the mass m of the oscillatory gyroscope 1 may improve the detecting sensitivity of the oscillatory gyroscope 1.

(10) The adder 47A adds the piezoelectric signals from the first and second differential circuits 45A, 46A, which have been multiplied by two, and multiplies the sum by four to produce the third piezoelectric signal. The adder 47B adds the piezoelectric signals from the first and second differential circuits 45B, 46B, which have been multiplied by two, and multiplies the sum by four to produce the third piezoelectric signal. The adder 48 then adds the third and fourth piezoelectric signals from the adders 47A, 47B, which have been multiplied by four, and multiplies the sum by eight to produce a further piezoelectric signal. Accordingly, the oscillatory gyroscope 41 outputs a relatively large piezoelectric signal. This increases the detecting sensitivity of the oscillatory gyroscope 1.

(11) The piezoelectric signal A, which is generated when a force F is applied to the PZT thin films 14, will now be described.

Figure 14:
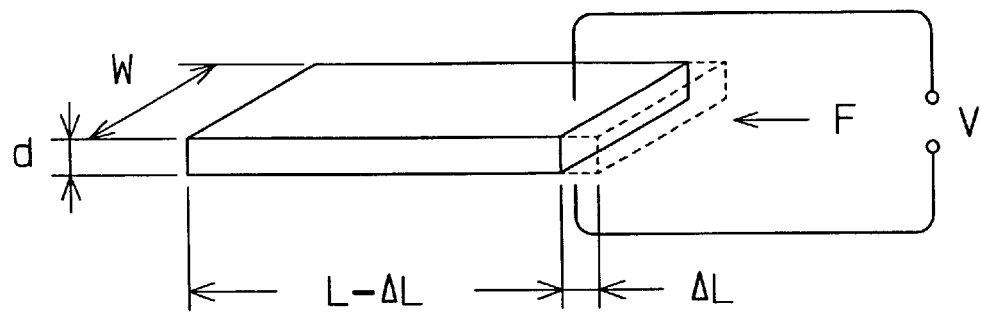
FIG. 14 is a schematic view illustrating the generation of voltage on a PZT thin film.

FIG. 14 shows a PZT thin film having a thickness d, a length L, and a width W. When a force F is applied to the PZT thin film in the longitudinal direction, the length L decreases to L−ΔL. In this state, +ΔQ and −ΔQ electric charges are generated on the front and rear surfaces of the PZT thin film in accordance with the polarity direction. Accordingly, the generated voltage A of the PZT thin film may be obtained from the following formula (2):

$$A = \Delta Q / C \tag{2}$$

where C indicates the capacitance. C can also be represented by the equation of:

$$C = (S \cdot \epsilon_0 \cdot \epsilon r)/d$$

where $\epsilon_0$ indicates the vacuum dielectric constant and $\epsilon r$ indicates the relative dielectric constant. S indicates the area of the PZT thin film (W.L). Therefore, the generated voltage A may also be obtained from the following formula (3):

$$A = (\Delta Q \cdot d)/(S \cdot \epsilon_0 \epsilon r) \tag{3}$$

Accordingly, the generated voltage increases as the area of the electrode films decreases.

In this embodiment, the first and second electrode films 15, 16 are separated from each other in the parallel plate segments 3A, 3B. Therefore, since the areas of the first and second electrode films 15, 16 is relatively small, a relatively large piezoelectric voltage A is generated.

(12) The arrangement of the pads 15a–18a is concentrated at the middle part of the oscillatory gyroscope 1. Therefore, the lead wires connected to the pads 15a–18a do not affect the oscillating characteristic of the oscillatory gyroscope 1. If the pads 15a–18a were arranged on the electrode films, the lead wires would change the rigidity of the parallel plate segments 2A, 2B and thereby affect the oscillating characteristic of the parallel plate segments 2A, 2B. If the lead wires were to be connected to the electrode films 15, 16 of the parallel plate segments 3A, 3B, the rigidity of the parallel plate segments 3A, 3B would change and affect the detecting characteristics of the parallel plate segments 3A, 3B.

It should be apparent to those skilled in the art that the present invention may be embodied in many other specific forms without departing from the spirit or scope of the invention. Particularly, it should be understood that the present invention may be embodied in the following forms.

Figure 15:
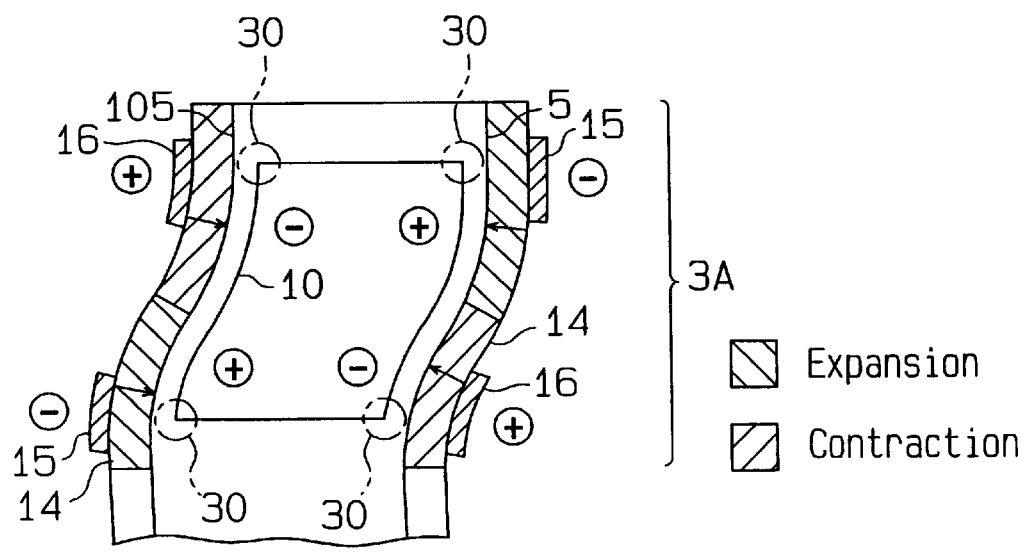
FIG. 15 is a schematic view illustrating the movement of an oscillatory gyroscope according to a further embodiment of the present invention.

(1) As shown by the dotted lines in FIG. 15, the first and second electrode films 15, 16 may be arranged at maximum stress concentration sections 30, which is where the maximum stress of the substrate 4 concentrates. The portions of the PZT thin film 14 corresponding to the maximum stress concentration sections 30 is where the PZT thin film 14 expands and contracts by a relatively large degree. Accordingly, the piezoelectric voltage at the maximum stress concentration sections 30 is relatively large.

(2) The electrode films 15–18, the extensions 15a–18a, and the pads 15b–18b need not be formed from aluminum. Other conductive materials such as gold (Au) may be employed.

(3) The electrode films 15–18, the extensions 15a–18a, and the pads 15b–18b on the PZT thin films 14 may be formed by employing a screen printing process and printing with a conductive paste.

(4) A plate-like support for supporting the oscillatory gyroscope 1 may be used in lieu of the fixed shaft 20. In this case, the plate-like support is fixed to the middle portion of the oscillatory gyroscope 1 such that the center axis of the support extends through the center of gravity of the oscillatory gyroscope 1.

(5) The lead wires connected to the pads 15b–18b may be inserted through the fixed shaft 20. Furthermore, an aluminum wiring, for example, may be sputtered onto the fixed shaft 20 to electrically connect the aluminum wiring to the pads. An aluminum wiring may also be formed on a plate-like support, employed in lieu of the fixed shaft 20, to electrically connect the aluminum wiring to the pads.

(6) The substrate 4 need not be formed from stainless steel and can be formed from other metals such as titanium. If the substrate 4 is formed from titanium, the formation of the titanium films 13 is unnecessary. In this case, the surface of the substrate 4 serves as the base surface.

(7) Instead of using the same substrate 4 to form the parallel plate segments 2A, 2B, 3A, 3B, a first substrate having the parallel plate segments 2A, 3A and a second substrate having the parallel plate segments 2B, 3B may be coupled to each other with an adhesive agent or the like after forming the titanium films and PZT thin films.

(8) The fixed shaft 20 may be arranged to extend from the first side 5 or the third side 105 at the center of gravity of the oscillatory gyroscope 1. In this case, one end of the fixed shaft 20 is supported by a base (not shown).

The present examples and embodiments are to be considered as illustrative and not restrictive, and the invention is not to be limited to the details given herein, but may be modified within the scope and equivalence of the appended claims.

What is claimed is:

1. An oscillatory gyroscope comprising:
    an elastic metal body in the form of a rectangular column having first to fourth sides, the first and third sides being opposite, and the second and fourth sides being opposite, the elastic metal body including a pair of end segments located at its ends and a pair of middle segments located at an upper middle portion and a lower middle portion of the elastic metal body, each end segment having an opening extending from the second side to the fourth side, and each middle segment having an opening extending from the first side to the third side;
    a first ferroelectric substance film provided on each of the first and third sides at the end segments;
    a second ferroelectric substance film provided on each of the second and fourth sides at the middle segments;

first and second electrodes provided on each first ferroelectric substance film at each end segment; and third and fourth electrodes provided on each second ferroelectric substance film at each middle segment.

2. The oscillatory gyroscope according to claim 1, further comprising a support member arranged to extend through the center of gravity of the elastic metal body between the middle segments.

3. The oscillatory gyroscope according to claim 2, wherein the first and second electrodes are provided on portions of the first ferroelectric substance films where stresses concentrate when the elastic metal body deforms.

4. The oscillatory gyroscope according to claim 1, further comprising:

a first titanium film provided under each of the first ferroelectric substance films at the end segments; and a second titanium film provided under each of the second ferroelectric substance films at the middle segments, wherein the first and second ferroelectric substance films comprise PZT thin films.

5. The oscillatory gyroscope according to claim 1, wherein the openings have rectangular cross-sections.

6. An oscillatory gyroscope apparatus comprising:

an oscillatory gyroscope, the gyroscope including:

an elastic metal body in the form of a rectangular column having first to fourth sides, the first and third sides being opposite, and the second and fourth sides being opposite, the elastic metal body including a pair of end segments located at its ends and a pair of middle segments located at an upper middle portion and a lower middle portion of the elastic metal body, each end segment having an opening extending from the second side to the fourth side, and each middle segment having an opening extending from the first side to the third side;

a first ferroelectric substance film provided on each of the first and third sides at the end segments;

a second ferroelectric substance film provided on each of the second and fourth sides at the middle segments;

first and second electrodes provided on each first ferroelectric substance film at each end segment; and third and fourth electrodes provided on each second ferroelectric substance film at each middle segment;

an oscillation circuit for generating an oscillation signal having a predetermined frequency;

a reverse amplification circuit connected to the oscillation circuit for reversing the oscillation signal and for generating a reverse voltage signal, the voltage signal being applied to the third electrodes of the middle segments;

a non-reverse amplification circuit connected to the oscillation circuit for generating a voltage signal based on the oscillation signal, the voltage signal being applied to the fourth electrodes of the middle segments;

a pair of first differential circuits, each first differential circuit being connected to the first and second electrodes of one of the end segments, respectively, wherein the pair of first differential circuits receive first piezoelectric signals generated by deformation of portions of the first ferroelectric substance films that correspond to the associated first and second electrodes, wherein the pair of first differential circuits generate first differential voltage signals representing the difference of the first piezoelectric signals;

a pair of second differential circuits, each second differential circuit being connected to the first and second electrodes of the other end segment, wherein the pair of second differential circuits receive second piezoelectric signals generated by deformation of portions of the corresponding first ferroelectric substance films, and the pair of second differential circuits generate second differential voltage signals representing the difference of the second piezoelectric signals;

a first adder connected to the pair of first differential circuits for adding the first differential voltage signals and generating a first added signal;

a second adder connected to the pair of second differential circuits for adding the second differential voltage signals and generating a second added signal; and a third adder connected to the first and second adder for adding the first and second added signals and generating a detection signal.

7. The oscillatory gyroscope apparatus according to claim 6, wherein the oscillatory gyroscope includes a support member arranged to extend through the center of gravity of the elastic metal body between the middle segments.

8. The oscillatory gyroscope apparatus according to claim 7, wherein the first and second electrodes are provided on portions of the first ferroelectric substance films where stresses concentrate when the elastic metal body deforms.

9. The oscillatory gyroscope apparatus according to claim 7, wherein the oscillatory gyroscope includes:

a first titanium film provided under each of the first ferroelectric substance films at the end segments; and a second titanium film provided under each of the second ferroelectric substance films at the middle segments, wherein the first and second ferroelectric substance films comprise PZT thin films.

10. The oscillatory gyroscope apparatus according to claim 7, wherein the openings have rectangular cross-sections.

* * * * *